US010997132B2

(12) United States Patent
Shivam et al.

(10) Patent No.: US 10,997,132 B2
(45) Date of Patent: May 4, 2021

(54) SYSTEMS AND METHODS FOR LIVE DATA MIGRATION WITH AUTOMATIC REDIRECTION

(71) Applicant: Oracle International Corporation, Redwood Shores, CA (US)

(72) Inventors: Piyush Shivam, Austin, TX (US); Vidyananth Balu, Milpitas, CA (US)

(73) Assignee: Oracle International Corporation, Redwood Shores, CA (US)

( * ) Notice: Subject to any disclaimer, the term of this patent is extended or adjusted under 35 U.S.C. 154(b) by 365 days.

(21) Appl. No.: 15/426,440

(22) Filed: Feb. 7, 2017

(65) Prior Publication Data
US 2018/0225288 A1    Aug. 9, 2018

(51) Int. Cl.
*G06F 16/21* (2019.01)
*H04L 29/08* (2006.01)
*G06F 9/50* (2006.01)

(52) U.S. Cl.
CPC ............ *G06F 16/214* (2019.01); *H04L 67/06* (2013.01); *H04L 67/10* (2013.01);
(Continued)

(58) Field of Classification Search
CPC .... G06F 16/188; G06F 16/214; G06F 9/5077; H04L 67/10; H04L 67/06; H04L 67/1097; H04L 67/1095
See application file for complete search history.

(56) References Cited

U.S. PATENT DOCUMENTS 7,080,105 B2 *  7/2006  Nakanishi ........... G06F 11/1451
7,167,965 B2 *  1/2007  Alvarez ............... G06F 11/3433
                                                              711/165
(Continued)

FOREIGN PATENT DOCUMENTS

CN    102473170 A    5/2012
CN    106411767 A    2/2017
(Continued)

OTHER PUBLICATIONS

Banks, et al., "Transparent Continuous Access to Infinite Data: A New Vision for Enterprise Data Management", 6th NASA Goddard Conference on Mass Storage Systems and Technologies 15th IEEE Symposium on Mass Storage Systems, Mar. 23-26, 1998, 5 pages.
(Continued)

*Primary Examiner* — Miranda Le
(74) *Attorney, Agent, or Firm* — Kilpatrick Townsend & Stockton LLP

(57) ABSTRACT

Some embodiments of the present invention provide systems and methods for live data migration with automatic redirection that overcome some or all of the downfalls of typical approaches. According to some embodiments, any client applications or devices accessing the migrated data may stay live and any new requests may be automatically redirected to the destination server to which the data was migrated. This may be accomplished, for example, using a combination of Server Message Block (SMB), Service Witness Protocol (SWP), and Distributed File System Referral Protocol (DFS).

15 Claims, 11 Drawing Sheets

(52) U.S. Cl.
 CPC ...... *H04L 67/1095* (2013.01); *H04L 67/1097* (2013.01); *G06F 9/5077* (2013.01)

(56) References Cited

U.S. PATENT DOCUMENTS

| | | | | |
|---|---|---|---|---|
| 7,240,122 | B2* | 7/2007 | Sato | H04L 29/06 709/232 |
| 7,499,905 | B2* | 3/2009 | Jaschek | G06F 16/172 |
| 7,865,462 | B2* | 1/2011 | Hara | G06Q 10/0637 707/610 |
| 8,180,843 | B2* | 5/2012 | Wong | H04L 67/1095 709/214 |
| 8,346,934 | B2* | 1/2013 | Okamoto | G06F 9/4856 370/221 |
| 8,577,836 | B2* | 11/2013 | Kopylovitz | G06F 16/214 707/609 |
| 8,745,210 | B2* | 6/2014 | Sekiguchi | G06F 9/5077 709/224 |
| 8,943,019 | B1* | 1/2015 | Patwardhan | G06F 16/119 707/610 |
| 9,258,262 | B2 | 2/2016 | Watt et al. | |
| 9,286,098 | B1 | 3/2016 | Baimetov et al. | |
| 9,306,825 | B2* | 4/2016 | Prahalad | H04L 12/1895 |
| 9,348,646 | B1* | 5/2016 | Daya | G06F 9/4856 |
| 9,430,483 | B1* | 8/2016 | Cowan | G06F 16/119 |
| 9,720,728 | B2* | 8/2017 | Yu | G06F 9/4856 |
| 9,733,860 | B2* | 8/2017 | Reuther | G06F 3/0647 |
| 9,864,530 | B2 | 1/2018 | Lakshman | |
| 10,009,428 | B2* | 6/2018 | Stopel | H04L 67/1097 |
| 2003/0074386 | A1* | 4/2003 | Schmidt | G06F 9/4451 718/1 |
| 2003/0115434 | A1* | 6/2003 | Mahalingam | H04L 67/1095 711/165 |
| 2003/0115438 | A1* | 6/2003 | Mahalingam | G06F 16/119 712/1 |
| 2004/0236797 | A1* | 11/2004 | Ikegaya | G06F 3/0616 |
| 2007/0130154 | A1* | 6/2007 | Venkatesan | G06F 16/285 |
| 2008/0086616 | A1* | 4/2008 | Asano | G06F 3/0605 711/165 |
| 2008/0104132 | A1* | 5/2008 | Toner | G06F 16/119 |
| 2008/0165967 | A1* | 7/2008 | Ross | G06F 21/10 380/258 |
| 2008/0235300 | A1* | 9/2008 | Nemoto | G06F 16/119 |
| 2009/0198704 | A1 | 8/2009 | Landberg | |
| 2010/0185587 | A1* | 7/2010 | Lovinger | G06F 16/119 707/660 |
| 2012/0117565 | A1 | 5/2012 | Staelin et al. | |
| 2013/0290454 | A1 | 10/2013 | Watt et al. | |
| 2014/0108350 | A1* | 4/2014 | Marsden | H04L 69/40 707/639 |
| 2014/0195599 | A1* | 7/2014 | Walsh | H04L 67/02 709/203 |
| 2014/0359144 | A1* | 12/2014 | Kruse | H04L 29/06197 709/228 |
| 2015/0113092 | A1 | 4/2015 | Chadha et al. | |
| 2015/0281356 | A1* | 10/2015 | Maturana | H04L 67/1097 709/217 |
| 2015/0370596 | A1* | 12/2015 | Fahs | G06F 9/46 718/1 |
| 2015/0378611 | A1 | 12/2015 | Prahlad et al. | |
| 2016/0004466 | A1 | 1/2016 | Lakshman | |
| 2016/0062785 | A1* | 3/2016 | Kumeta | G06F 9/45558 718/1 |
| 2017/0235591 | A1* | 8/2017 | Kanada | G06F 11/2025 714/6.23 |
| 2017/0277729 | A1 | 9/2017 | Dain et al. | |
| 2018/0018099 | A1 | 1/2018 | Prahlad et al. | |
| 2018/0089226 | A1 | 3/2018 | Dayan et al. | |

FOREIGN PATENT DOCUMENTS

| | | |
|---|---|---|
| CN | 106649600 A | 5/2017 |
| EP | 2457176 A1 | 5/2012 |
| FR | 3049083 A1 | 9/2017 |
| WO | 2011011016 A1 | 1/2011 |
| WO | 2016004120 A2 | 1/2016 |
| WO | 2017001915 A1 | 1/2017 |

OTHER PUBLICATIONS

Benson, et al., "Network Traffic Characteristics of Data Centers in the Wild", *IMC, 10*, Nov. 1-3, 2010, 14 pages.

Borrill; Paul, "Smart Data and Wicked Problems", Conference Paper, Vanguard, at Atlanta, GA, Feb. 2008, 21 pages.

Braam; Peter J, "File systems for clusters from a protocol perspective", Second Extreme Linux Topics Workshop, Jun. 1999, 5 pages.

Byan, et al., "Mercury: Host-side flash caching for the data center", Advanced Technology Group, Net App, 28th IEEE Conference on Mass Storage Systems and Technologies (MSST), 42 pages, Apr. 20, 2012.

Chen, et al., "Data Security and Privacy Protection Issues in Cloud Computing", 2012 International Conference on Computer Science and Electronics Engineering, Mar. 2012, 6 pages.

Guttman, et al., "Request for Coments: 2608", Network Working Group, RFC 2608 Service Location Protocol, Version 2, Jun. 1999, 108 pages.

Kamoshida, et al., "Next-Generation Data Center Outsourcing Services" Fujitsu Scientific & Technical Journal, 2010, retrieved May 15, 2018, 11 pages. https://www.fujitsu.com/global/documents/about/resources/publications/fstj/archives/vol46-4/paper14.pdf.

Lee; et al., "Enhancing Data Migration Performance via Parallel Data Compression", Conference Paper, Feb. 2002, all pages https://www.researchgate.net/publication/3956475_Enhancing_data_migration_performance_via_parallel_data_compression/file/72e7e5181f21024196.pdf.

Martin, et al., "Development and implementation of a climate data management system for western Pacific small island developing states", Meterological Applications, May 2, 2014.

Matheus; Pedro Henrique, "Using Decision Trees to Extract IDS Rules from Honeypot Data" International Journal of Cyber-Security and Digital Forensics (IJCSDF) 4(3): 427-441427The Society of Digital Information and Wireless Communications, 2015 (ISSN: 2305-0012), May 5, 2015, 16 pages. https://www.researchgate.net/publication/275891509_Using_Decision_Trees_to_Extract_IDS_Rules_from_Honeypot_Data.

Messig, et al., "Service migration in autonomic service oriented grids", AusGrid '08 Proceedings of the sixth Australasian workshop on Grid computing and e-research—vol. 82, pp. 45-54 Jan. 2008.

Ryan, et al. "Using event-based translation to support dynamic protocol evolution", Proceedings of the 26th International Conference on Software Engineering (ICSE'04).

Sharma, et al., "Seed Block Algorithm: A Remote Smart Data Back-up Technique for Cloud Computing" Seed Block Algorithm: A Remote Smart Data Back-up Technique for Cloud Computing, Apr. 2013, 6 pages.

Strutz, et al., "ASAP3—New Data Taking and Analysis Infrastructure for PETRA III", 21st International Conference on Computing in High Energy and Nuclear Physics (CHEP2015) IOP Publishing, Journal of Physics: Conference Series 664 (2015) 042053, doi:10.1088/1742-6596/664/4/042053, 9 pages.

Sutter, et al., "The Large Scale Data Facility: Data Intesive Computing for scientific experiments", 2011 IEEE International Parallel & Distributed Processing Symposium, 2011, 8 pages.

Venkataram, et al., "A Method of Data Transfer Control During Handoffs in Mobile-IP Based Multimedia Networks" Mobile Computing and Communications Review, vol. 5, No. 2, Apr. 1, 2001, 8 pages.

Widup, et al., "2014 Data Breach Investigations Report", Verizon Technical Report, 2014, 60 Pages.

\* cited by examiner

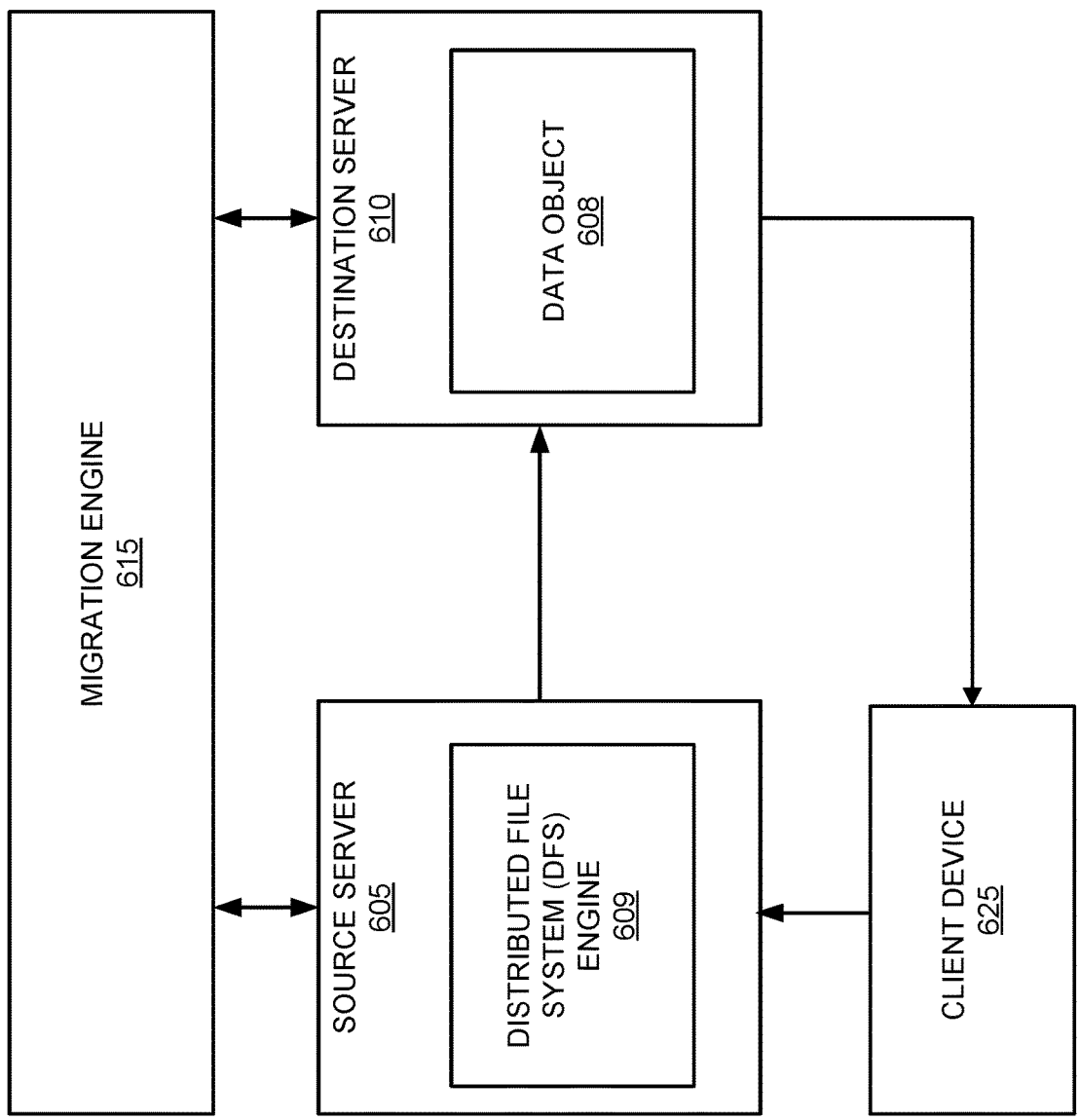

SYSTEMS AND METHODS FOR LIVE DATA MIGRATION WITH AUTOMATIC REDIRECTION

FIELD

The present disclosure generally relates to storage systems, and more specifically to systems and methods for live data migration with automatic redirection.

BACKGROUND

Migrating a complex database system can be a daunting task. Complex database systems are typically maintained by corporations, governments, and other large-scale entities (collectively referred to as customers) that have a limited ability to tolerate database systems being offline. As such, when mission-critical database systems are to be migrated from a first server system to a second (likely newer and more advanced) server system, the customer is likely desirable of an efficient and timely migration.

BRIEF SUMMARY

Provided are methods, including computer-implemented methods, devices including storage devices, and computer-program products for live data migration with automatic redirection.

According to some embodiments of the invention, a method is provided. The method comprises receiving a request for a migration notification for a subset of data from a client device. The method further comprises detecting initiation of migration of the data from a source server to a destination server. The method further comprises monitoring progress of the migration of the data from the source server to the destination server. The method further comprises, during migration of the data from the source server to the destination server and after the subset of the data is migrated to the destination server, generation the migration notification. The migration notification indicates that the subset of the data was migrated from the source server to the destination server. The migration notification includes an address for the destination server. The method further comprises facilitating retrieval of the subset of the data from the destination server by the client device using the address. Facilitating includes transmitting the migration notification to the client device.

According to some embodiments of the invention, a device is provided. The device comprises one or more processors. The device further comprises a non-transitory computer-readable medium containing instructions that, when executed by the one or more processors, cause the one or more processors to perform operations including the steps of the above method.

According to some embodiments of the invention, a computer-program product is provided. The computer-program product is tangibly embodied in a non-transitory machine-readable storage medium of a device. The computer-program product includes instructions that, when executed by one or more processors, cause the one or more processors to perform operations including the steps of the above method.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 6C is a block diagram illustrating a migration system that may be used by a new client device after a data object is migrated from the source server to a destination server, in accordance with some embodiments.

DETAILED DESCRIPTION

Figure 1:
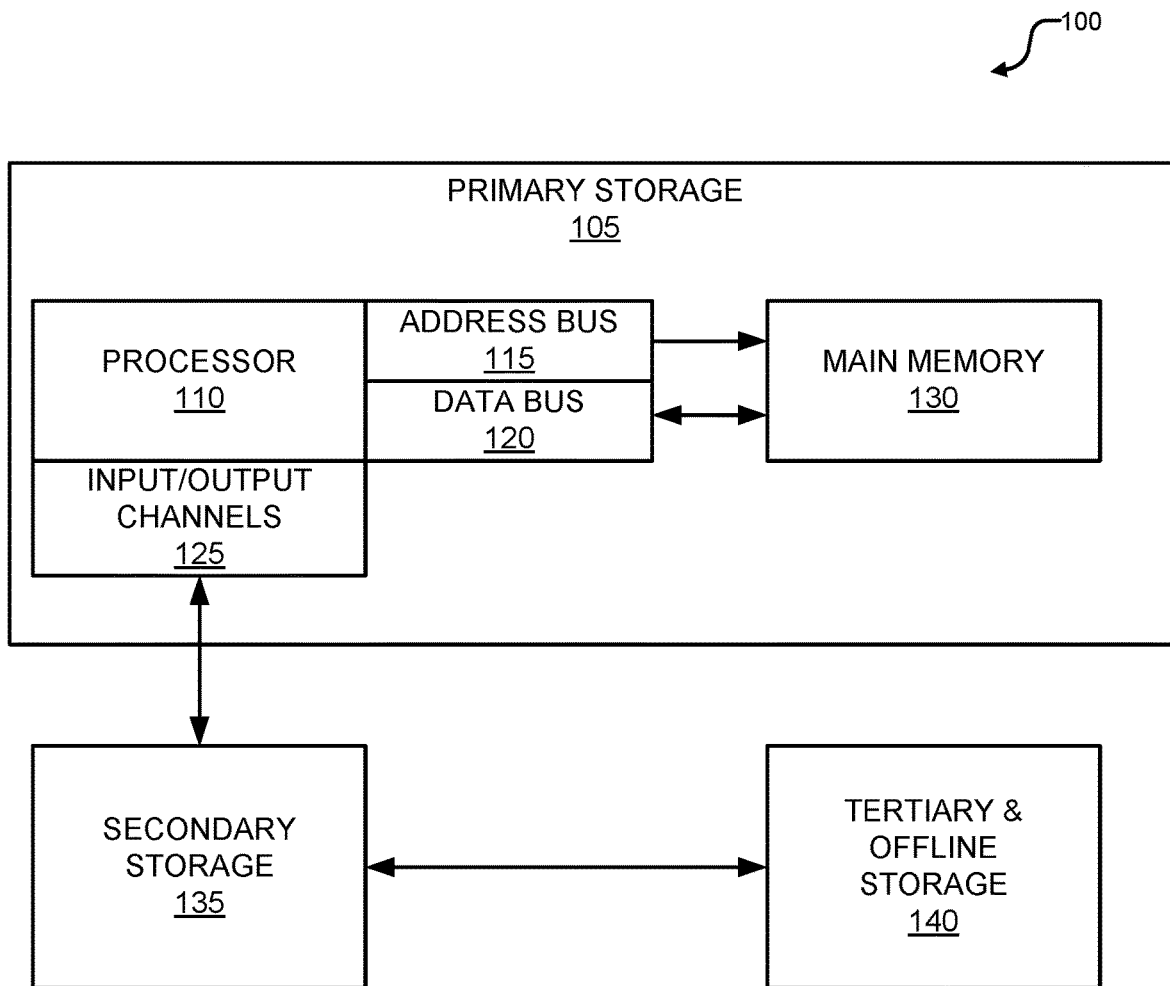
FIG. 1 is a block diagram illustrating a data storage system, in accordance with some embodiments.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Data Storage Systems

Data storage systems may include any separate or combined storage devices and/or components that are used to retain, and in some cases process, data. Without data storage systems, computing devices would be limited to the performance of certain operations and would have to immediately output the result. The use of data storage systems may allow computing devices to perform a wider range of operations, store and reference the results of performed operations (either short-term or long-term), and store and execute specialty applications for a variety of purposes. As used herein, a "storage device" may be any component or combination of components used to retain data in a data storage system.

FIG. 1 is a block diagram illustrating a data storage system 100, in accordance with some embodiments. The data storage system 100 may be included, in whole or in part, in one or more computing devices, such as personal computers (e.g., clients) or servers (e.g., hosts). The data storage system 100 may include primary storage 105, secondary storage 135, and tertiary & offline storage 140. Although shown and described as including these three different types of storage, it is contemplated that the data storage system 100 may implement more or less different types of storage, either separately or in combination. Further, although shown and described as including one of each of these different types of storage, it is contemplated that none or more than one of the different types of storage may be included. For example, in some embodiments, more than one storage device may be included in secondary storage 135.

Primary storage 105 may include a processor 110 (or more than one processor 110) and main memory 130. The processor 110 may be or include, for example, a central processing unit (CPU). The processor 110 may retrieve and manipulate data stored in the data storage system 100. Thus, in general, data stored in the data storage system 100 in close proximity to the processor 110 may be retrieved and processed fastest, while data stored in the data storage system 100 further from the processor 110 may be processed slower. However, frequently, some configurations can result in only a small amount of data being available to be stored in close proximity to the processor 110 (and in some embodiments, only temporarily), while larger storage options may generally be positioned further from the processor 110 (and may be used to permanently store data).

The processor 110 may include its own memory (not shown). The memory of processor 110 may include one or more processor registers and one or more processor caches. The processor registers may hold a small discrete amount of data (e.g., 8, 32 or 64 bits). The processor registers may take on any of a number of forms. For example, the processor registers may include one or more data registers. The processor 110 may load data from larger storage in the data storage system 100 (e.g., main memory 130) into the data registers to perform operations or manipulations on the data. The data may then be stored back to the larger storage (e.g., main memory 130). In another example, the processor registers may include one or more address registers. The address registers may hold addresses for data that may be requested by executed instructions. In still another example, the processor registers may include one or more general purpose registers. The general purpose registers may be combination registers that may store data and/or addresses. Other types of registers that may be alternatively or additionally included in the processor registers include floating point registers, status registers, constant registers, vector registers, special purpose registers, machine specific registers, internal registers, and the like. The processor registers may be the fastest type of storage available in the data storage system 100 due to its location inside the processor 110, but may be limited by a small amount of data.

The processor 110 may also include one or more processor caches. The processor caches may include one or more data caches. The data caches may store data that is frequently used. The processor caches may alternatively or additionally include one or more instruction caches. The instruction caches may store executable instructions that are frequently used. The processor caches may alternatively or additionally include a translation lookaside buffer. The translation lookaside buffer may be used to expedite virtual-to-physical address translation for executable instructions and data. Although the processor caches are also located inside the processor 110, they may be slower than the processor registers. However, the processor caches may be preferable over the main memory 130 for storage of actively or commonly used data or instructions in small amounts, as the processor caches may be accessed faster than the main memory 130.

The processor 110 may be directly or indirectly coupled to the main memory 130 over an address bus 115 and a data bus 120. When requesting certain data from the main memory 130, the processor 110 may send a memory address to the main memory 130 over the address bus 115. The memory address may indicate the location of the data being requested. The processor 110 may then read the data from the main memory 130 over the data bus 120. The processor 110 may alternatively or additionally write data to the main memory 130 over the data bus 120.

The main memory 130 may include, for example, random access memory (RAM), such as dynamic RAM (DRAM), static RAM (SRAM), synchronous DRAM (SDRAM), or any other type of volatile storage. "Volatile" storage, as used herein, may refer to a characteristic of storage devices that do not retain their contents when not supplied with power and thus are uninitialized upon booting up (e.g., temporary storage). In other words, volatile storage may require a constant source of power to retain stored data. Although the main memory 130 may be volatile, access to data stored therein is generally faster than that stored in secondary storage 135 or tertiary & offline storage 140 due to its close proximity to the processor 110. In some embodiments, the primary storage 105 may also include non-volatile storage, such as read only memory (ROM).

The processor 110 may use input/output channels 125 to access the secondary storage 135. The secondary storage 135 may include, for example, hard disk drives, flash memory, or any other type of non-volatile storage. "Non-volatile" storage, as used herein, may refer to a characteristic of storage devices that retain their contents when powered down, and data may be stored therein temporarily or permanently. The secondary storage 135 may have one or more file systems stored thereon that may provide a hierarchy of files and directories stored in the secondary storage 135, as described further herein with respect to FIG. 3. In some embodiments, the secondary storage 135 may also include volatile storage, such as RAM disks.

In some embodiments, the primary storage 105 is collocated with the secondary storage 135, e.g., on a single computing device. However, it is contemplated that in some embodiments, the primary storage 105 may be located remotely from the secondary storage 135, e.g., on two or more different computing devices. For example, the secondary storage 135 may be located at a host, while the primary storage 105 may be located at a client. The client may issue commands to retrieve and access data stored on the secondary storage 135 at the host using the processor 110 of the primary storage 105 at the client.

Tertiary & offline storage 140 may include tertiary storage, such as removable mass storage media used to store large amounts of data that is not accessed often, but may be accessed without human intervention using robotic technologies. Tertiary & offline storage 140 may alternatively or additionally include offline storage, such as removable storage media that may not be accessed without human intervention, such as CD-ROMs, CD-RWs, DVDs, floppy disks, Universal Serial Bus (USB) flash drives, and the like. Offline storage may be recorded and physically disconnected from the data storage system 100. Although shown as being in communication with the secondary storage 135, it is contemplated that the tertiary & offline storage 140 may alternatively or additionally be in direct communication with the primary storage 105.

File Systems

Figure 2:
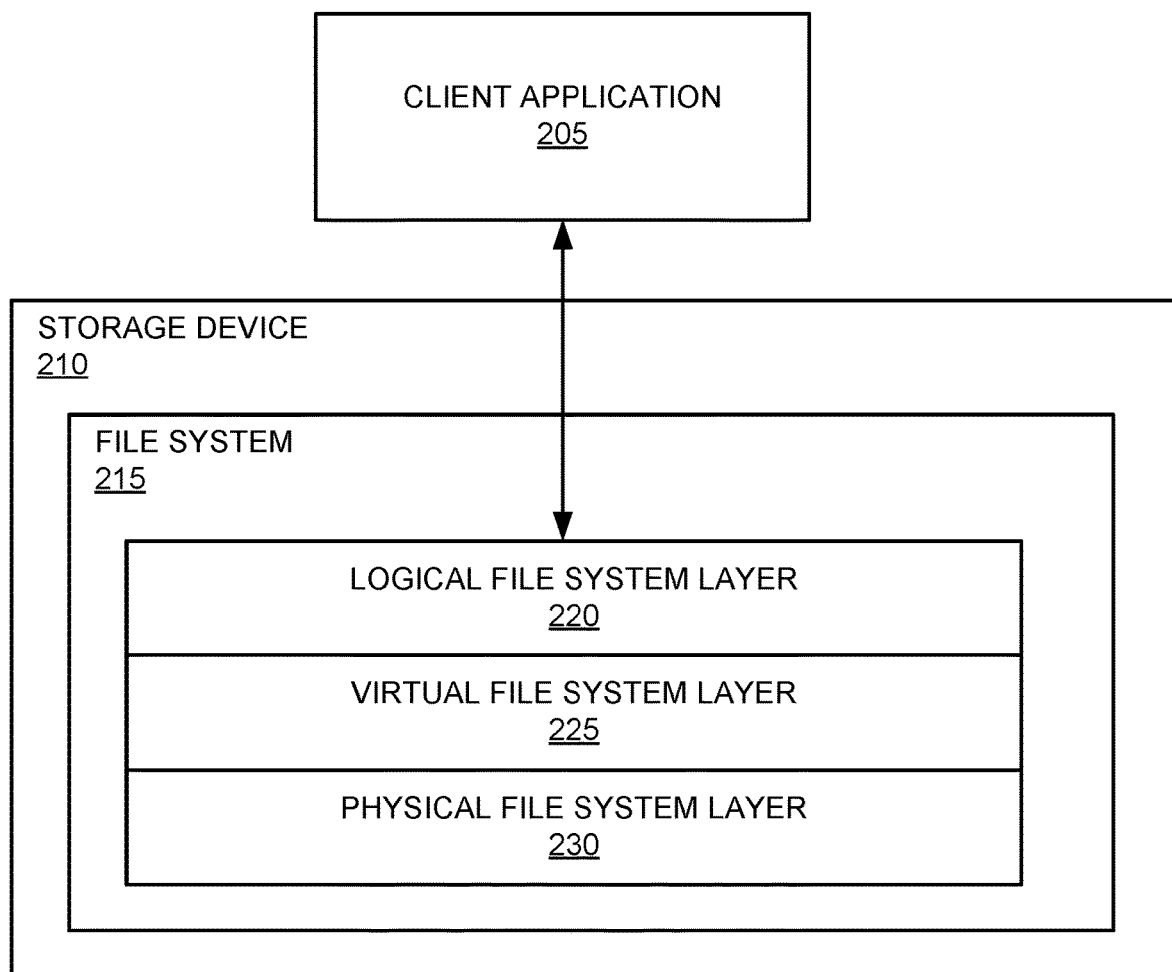
FIG. 2 is a block diagram illustrating the layers of a file system of a storage device, in accordance with some embodiments.
Figure 3:
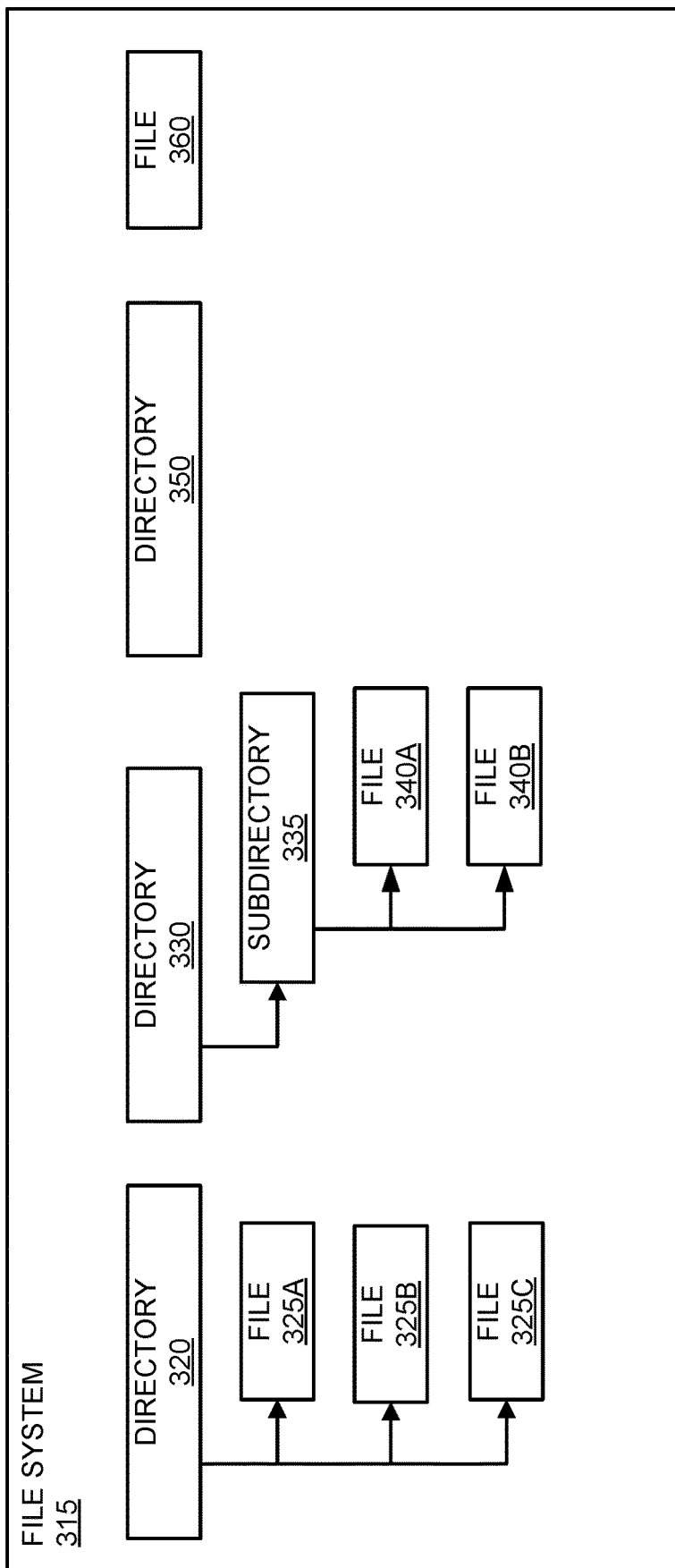
FIG. 3 is a block diagram illustrating a hierarchy for data stored or mounted in a file system, in accordance with some embodiments.

A storage device of a data storage system may implement one or more file systems to organize the data stored thereon. As used herein, a "file system" may refer to a structure or organization of files or directories, and a "file" may refer to a group of data. Each file may be associated with a filename that allows that file to be uniquely identified and located. A number of different file systems may be used depending on the specific requirements and desired applications. FIGS. 2 and 3 illustrate exemplary file systems that may be implemented on a storage device.

FIG. 2 is a block diagram illustrating the layers of a file system 215 of a storage device 210, in accordance with some embodiments. The file system 215 may have three layers: a logical file system layer 220, a virtual file system layer 225, and a physical file system layer 230. Although shown and described as having these three layers, it is contemplated that fewer or more layers may be used. For example, in some embodiments, the functions of the logical file system layer 220, the virtual file system layer 225, and the physical file system layer 230 may be combined into a single layer. In some embodiments, the virtual file system layer 225 may be omitted.

The logical file system layer 220 may interact with the client application 205 to process requests for data. The logical file system layer 220 may provide the application programming interface (API) for file access and operations (e.g., open, close, read, write, etc.). The logical file system layer 220 may receive the requested operation and may pass it to the virtual file system layer 225 to be passed to the physical file system layer 230.

The logical file system layer 220 may provide a consistent view of multiple physical file systems that may be defined by multiple file system implementations. This consistency may be provided by the abstraction of the physical file system layer 230 that is implemented by the virtual file system layer 225. The abstraction may specify a set of operations that a given implementation should include in order to carry out file system requests received through the logical file system layer 220. Thus, the abstraction carried out by the virtual file system layer 225 may provide a uniform interface to the logical file system layer 220.

In other words, the virtual file system layer 225 may provide support for multiple different physical file systems. The virtual file system layer 225 may allow the client application 205 to access different types of file systems in a uniform way. For example, the virtual file system layer 225 may allow the client application 205 to access file systems on both local storage devices and network storage devices, file systems for different operating systems (e.g., Windows, Mac OS, Unix, etc.), file systems of different types (e.g., Unix file system (UFS), network file system (NFS), etc.), and the like.

The physical file system layer 230 may process the requested operation on a file (e.g., read, write, etc.). The physical file system layer 230 may physically place files in specific locations on the storage device 210. The physical file system layer 230 may interact with the drivers of the storage device 210 to physically operate the storage device 210.

FIG. 3 is a block diagram illustrating a hierarchy for data stored or mounted in a file system 315, in accordance with some embodiments. In some embodiments, data may be physically stored in the file system 315 according to the hierarchy shown in FIG. 3, such as in a Windows operating system (using file systems such as, e.g., FAT, NTFS, exFAT, Live File System, ReFS file system, etc.). In some embodiments, data may instead be physically stored under a single root directory. The file system 315 may be "mounted" by informing the operating system where in the hierarchy certain files should appear. These embodiments may be implemented in a Unix or Unix-like operating system.

The file system 315 may include one or more directories (e.g., directories 320, 330, 350), one or more subdirectories (e.g., subdirectory 335), and one or more files (e.g., files 325A-C, 340A-B, 360). Directories (which may also be referred to herein as "folders") may group files into separate collections. For example, directory 320 may include files 325A-C. Directories may also include subdirectories. For example, directory 330 may include subdirectory 335, and subdirectory 335 may include files 340A-B. Directories may also be created without any files (e.g., directory 350). Files may also be located in the file system 315 without an associated directory (e.g., file 360).

File (e.g., files 325A-C, 340A-B, 360) within the file system 315 may have associated metadata. The metadata may be stored separately from the file (not shown). The metadata may include, for example, the amount of data in the file, a file timestamp (e.g., the last time the file was modified, when the file was created, the time the file was last backed up, and/or when the file was last accessed), a user ID, access permissions, file attributes (e.g., read only, read/write, etc.), and the like.

Network Devices

Figure 4:
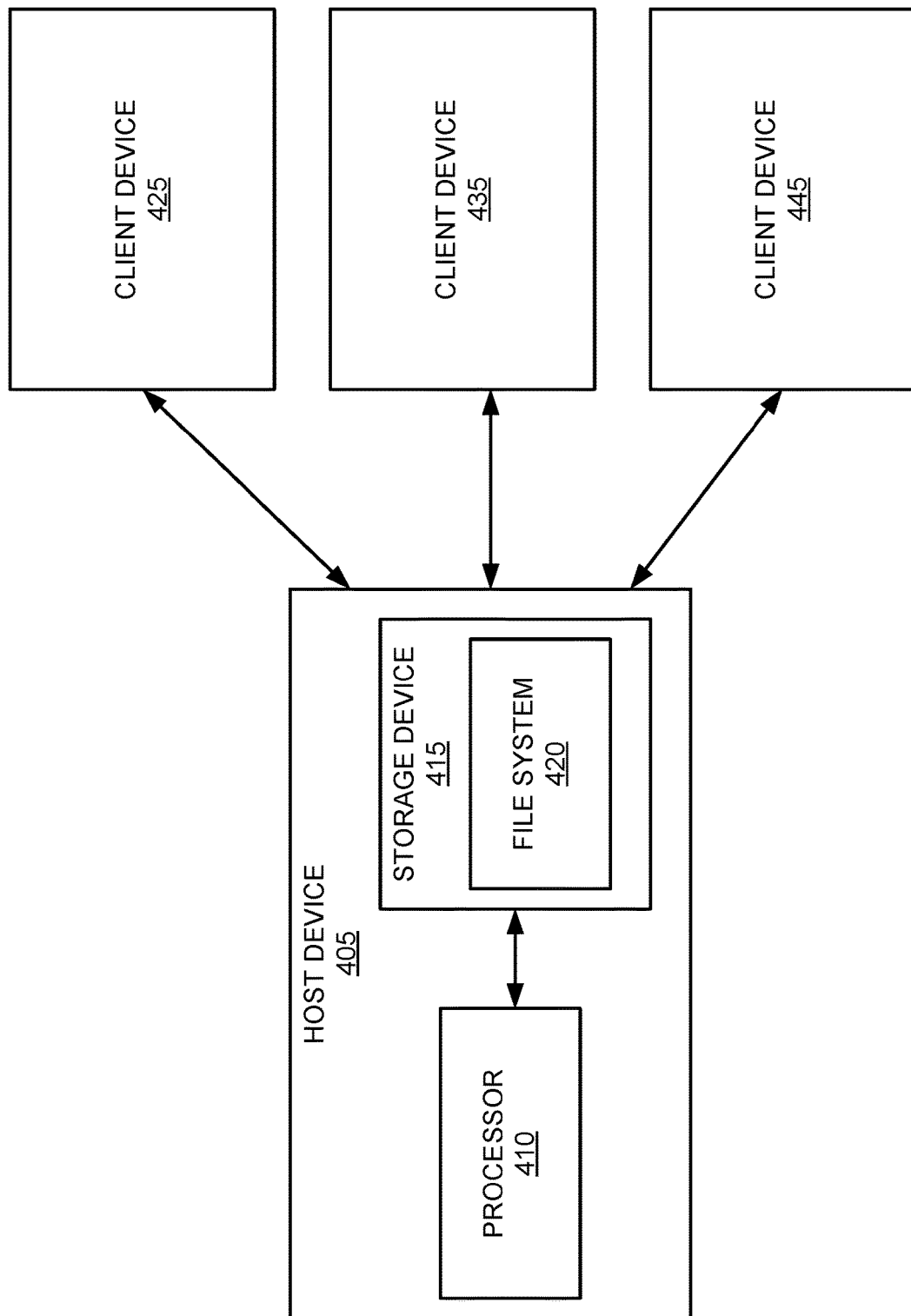
FIG. 4 is a block diagram illustrating a host device in a network, in accordance with some embodiments.

Data storage systems may be implemented as network devices accessible by client devices over a network. FIG. 4 is a block diagram illustrating a host device 405 in a network, in accordance with some embodiments. The host device 405 may be a host storage device, host computing device (e.g., a host server), and/or host data storage system. The host device 405 may include a processor 410 and storage 415. The processor 410 may be similar to the processor 110 of FIG. 1. The storage 415 may include primary storage 105, secondary storage 135, and/or tertiary & offline storage 140 of FIG. 1. The storage 415 may include a file system 420, which may be similar to file system 215 of FIG. 2 and/or file system 315 of FIG. 3. As discussed herein with respect to FIG. 1, it is contemplated that in some embodiments, processor 410 of host device 405 is not necessary, and respective processors of client devices 425, 435, 445 may be used to process requests for data from host device 405. As used herein, a "request" for data may include a mount. A mount may include a request to make a data object accessible to a user.

The host device 405 may communicate over a network with the client devices 425, 435, 445. As used herein, a "client device" may refer to any device requesting data from another device. It is contemplated that a client device may include a client application executing on the client device to facilitate the requesting, transfer, use and storage of data. The host device 405 may communicate with the client devices 425, 435, 445 through any standard data connection, including but not limited to an Internet connection. This may include a wireless channel (e.g., a Wi-Fi connection), a wired connection (e.g., DSL, cable modem, etc.), or a combination of both. The client devices 425, 435, 445 may utilize the host device 405 to store data, define rules, set permissions, and the like. The host device 405 may also be in communication with one or more user devices (not shown). The user devices may utilize the host device 405 to request and/or use data. In addition, although shown and described as being in communication with three client devices 425, 435, 445, it is contemplated that host device 405 may be in communication with any number of client devices in this embodiment.

The host device 405 may store data that may be requested by and transmitted to the client devices 425, 435, 445 for any purpose. In these embodiments, data that may be requested from the host device 405 may be referred to as a "share", i.e., a resource that may be made available by one device to other devices. For example, the client devices 425, 435, 445 may be requesting an application or service. In another example, the host device 405 may be performing migration of one or more files, file systems, and/or databases to one or more of client devices 425, 435, 445.

Migration Systems

Migration is the process of transferring data objects between separate storage devices. In some embodiments, separate storage devices may be included in a single computing device or in separate computing devices. As used herein, "data objects" may refer to any of data, metadata, files, records, applications, subdirectories, directories, file systems, any combinations thereof, and the like. Migration may be performed for any of a number of reasons, including replacement of a storage device or computing device, maintenance of a storage device or computing device, upgrade of a storage device or computing device, relocation of a storage device or computing device, and the like.

To achieve migration, three steps may typically be performed. First, data extraction may be performed from a source server. As used herein, a "source server" may refer to an originator of a data object to be migrated, and may include one or more storage devices storing the data object and, in some embodiments, one or more processors. In some embodiments, a "source server" may include more than one server. Data extraction may involve retrieving the data object from the source server. Second, data transformation may be performed on the data object. Data transformation may apply a series of rules to the data object to prepare it for loading on a destination server. As used herein, a "destination server" (which may be used interchangeably with the term "target server") may refer to a recipient of a data object to be migrated, and may include one or more storage devices to store the data object and, in some embodiments, one or more processors. In some embodiments, a "destination server" may include more than one server. In some embodiments, however, data transformation may not be necessary. For example, the data object may be able to be directly moved or passed through from the source server to the destination server. This may be the case, for example, if the source server and the destination server both implement similarly structured storage devices. Third, data loading may be performed onto the destination server. Data loading may involve writing the data object to the storage device of the destination server.

The data may be shared between the source server and the destination server using one or more data sharing protocols, such as the Server Message Block (SMB) protocol. SMB is a network file sharing protocol that allows data to be shared and/or accessed remotely at a client device. SMB works through a client-server architecture, where a client device makes specific requests for data from a server and the server services the requests accordingly. SMB is described further herein with respect to FIG. 8.

When data is migrated from a source server to a destination server, a number of challenges may arise. For example, it may be desirable for any client devices or applications accessing the data on the source server to stay live and not be disrupted. In another example, it may be desirable for the client applications or devices to be automatically redirected to the destination server after the data has been migrated to the destination server. Typical migration approaches may require significant downtime and may result in loss of data, protocol information, and/or resource availability.

These challenges are typically addressed by one or more of a variety of undesirable solutions. First, a complex cluster file system may be used to migrate the data. Such complex cluster file systems may require special purpose and expensive cluster interconnects and interconnect protocols. For example, the client devices that were accessing the source server before the migration would continue to access the source server even after the migration. The data is fetched from the destination server by the source server by the cluster file system software, then returned to the client. This requires specialized software and high-speed hardware. This approach also introduces the additional latency of going through the source server to retrieve data. In addition, the cluster file system approach works only for storage servers that are connected through the cluster file system. If there are two independent servers that are not connected through the same cluster file system, then live data migration cannot be accomplished.

Second, a proxy server may be used that sits between the client devices and the source and destination servers. The proxy server may redirect requests for data destined for the source server from the client device to the destination server once the data has been migrated. Thus, all traffic must go through a single proxy server which can then redirect the traffic to the proper destination using a mapping between the requests from the client devices and the appropriate server. This approach requires special-purpose proxy hardware and software and does not scale, as all client traffic is going through the proxy server, as opposed to directly to the destination server. In addition, the use of a proxy server may introduce delays in processing and responding to requests for data from the client device.

Third, some migration approaches require that all of the data be migrated from the source server to the destination server before redirecting client requests. The IP address of the source server is migrated to the destination server along with the data. Thus, future requests from client devices to that IP address are automatically directed to the destination server without explicit knowledge of the client. Such an approach makes it impossible to migrate only a subset of data that is being accessed over an IP address.

Thus, some embodiments of the present invention provide systems and methods for live data migration with automatic redirection that overcome some or all of the downfalls of traditional approaches. According to some embodiments, any client applications or devices accessing the migrated data may stay live and any new requests may be automatically redirected to the destination server to which the data was migrated. This may be accomplished, for example, using a combination of network protocols (e.g., Server Message Block (SMB)), notification services (e.g., Service Witness Protocol (SWP)), and/or referral services (e.g., Distributed File System Referral Protocol (DFS)). Although described herein with respect to these particular protocols, it is contemplated that the embodiments described herein may be implemented with other protocols as well, singly or in any combination.

Figure 5:
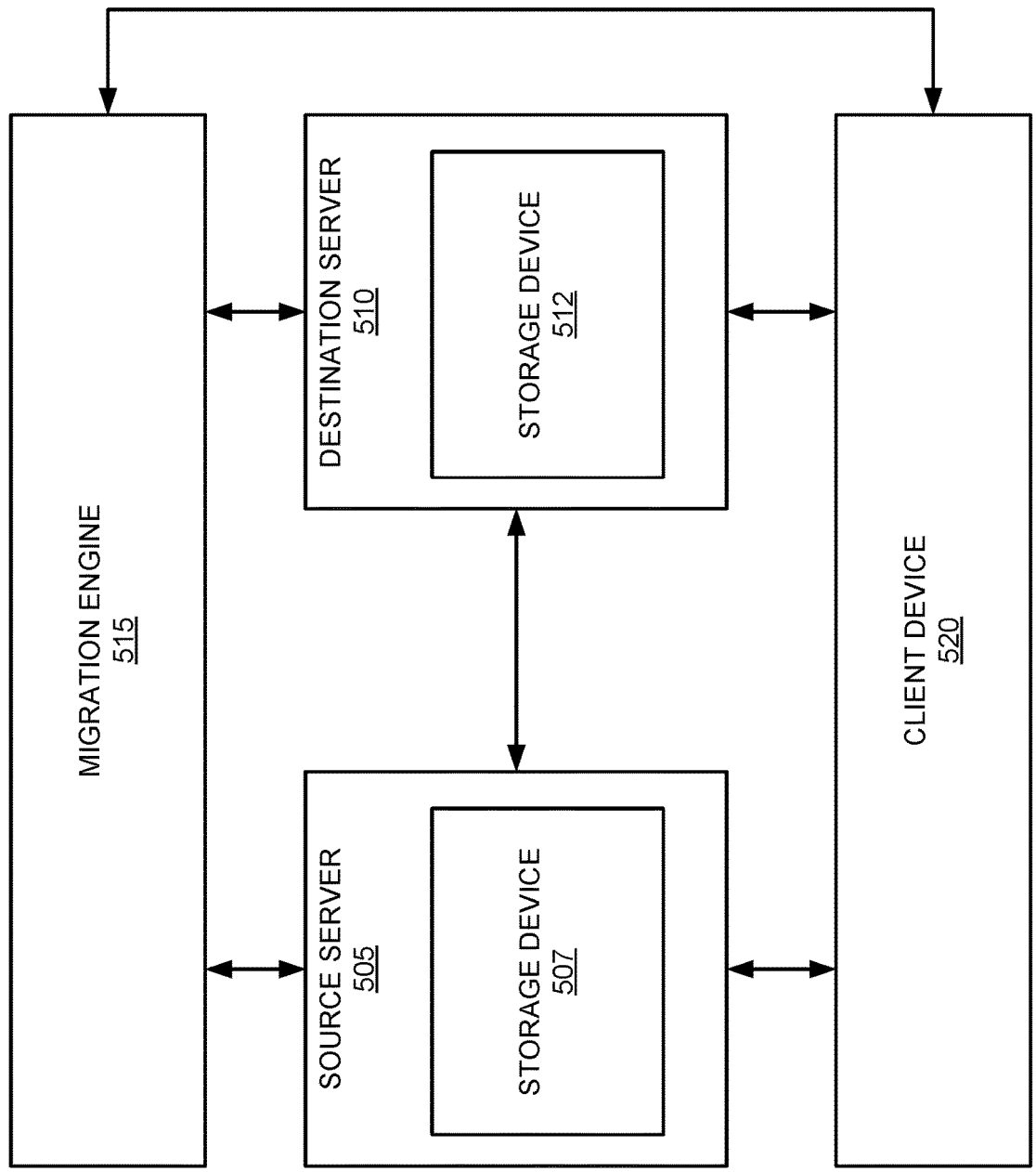
FIG. 5 is a block diagram illustrating a migration system, in accordance with some embodiments.

FIG. 5 is a block diagram illustrating a migration system, in accordance with some embodiments. The migration system includes a source server 505, a destination server 510, a migration engine 515, and a client device 520. Each of the source server 505, the destination server 510, the migration engine 515, and the client device 520 may be in operative communication with each other, such as, for example, over a network, or over any type of wired or wireless connection, such as a WiFi network, a local area network (LAN), a wireless LAN, a personal area network (PAN), a metropolitan area network (MAN), a wide area network (WAN), a storage area network (SAN), a system area network, and enterprise private network (EPN), a virtual private network (VPN), a cellular network, combinations thereof, and the like. The source server 505 may include a storage device 507, and the destination server may include a storage device 512. Although shown as including a single client device 520, it is contemplated that any number of client devices may be included in the migration system illustrated in FIG. 5, and may perform the functions of the client device 520 described herein.

Some or all of the data maintained on the storage device 507 of the source server 505 may be shared with the destination server 510 using one or more data sharing protocols, such as SMB. The migration engine 515 may perform a variety of functions, including monitoring progress of the migration of data from the source server 505 to the destination server 510. Although shown and described as a separate component from the source server 505 and the destination server 510, it is contemplated that the migration engine 515 may alternatively or additionally, in whole or in part, reside in the source server 505 and/or the destination server 510.

In use, the client device 520 may register with the migration engine 515 to receive a migration notification for a subset of data that may be migrated from the source server 505 to the destination server 510. The registration may include, for example, an identifier of the client device 520 (e.g., an IP address, a MAC address, etc.) and an identifier of the subset of the data (e.g., a file system, a file name, a directory, a folder, etc.). The subset of data may be required, for example, to continue executing an application running on the client device 520. Although referred to as a "subset" of data, it is contemplated that the client device 520 may request a migration notification for any amount of the data to be migrated from the source server 505 to the destination server 510, including all of the data or one or more particular data objects, such as a file system. In the case of multiple data objects, multiple migration notifications may be requested such that the client device 520 is aware when each data object has been migrated. Thus, although described herein with respect to "a migration notification", it is contemplated that the client device 520 may register to receive multiple migration notifications.

In some embodiments, the client device 520 may be prompted to register for the migration notification by the migration engine 515 based on its access permissions with respect to the subset of the data. For example, the migration engine 515 may determine that the client device 520 has read permissions with respect to a certain application's files that are to be migrated. In another example, the migration engine 515 may prompt the client device 520 to register for the migration notification based on prior access to the subset of the data. Based on one or more of these determinations, the migration engine 515 may present the client device 520 with an option to register for the migration notification as the client device 520 would likely be interested in continuing to access the subset of the data.

During migration, the migration engine 515 may detect initiation of migration of the data from the source server 505 to the destination server 510. For example, the source server 505 and/or the destination server 510 may detect user input initiating migration. In another example, when included in the source server 505, the migration engine 515 may detect that data is being uploaded from the source server 505. In still another example, when included in the destination server 510, the migration engine 515 may detect that data is being downloaded to the destination server 510. In still another example, the source server 505 and/or the destination server 510 may send a notification to the migration engine 515 that migration has been initiated. For example, when located externally from the source server 505 and the destination server 510, the migration engine 515 may establish a rule with the source server 505 and/or the destination server 510 that causes the source server 505 and/or the destination server 510 to send a notification once migration has been detected.

Once migration from the source server 505 to the destination server 510 has been initiated, the migration engine 515 monitors the progress of the migration. For example, the migration engine 515 may monitor all data that has been migrated from the source server 505 to the destination server 510 in real time or near real time, as reported by the source server 505 and/or the destination server 510. For example, the migration engine 515 may establish a rule with the source server 505 and/or the destination server 510 that causes the source server 505 and/or the destination server 510 to send periodic notifications during migration (e.g., at a certain percentage of completion, at a certain duration of time, when a directory has been migrated, etc.). In some embodiments, the migration engine 515 may monitor the progress of only the subset of data needed to generate the migration notification. For example, the migration engine 515 may establish a rule with the source server 505 and/or the destination server 510 that causes the source server 505 and/or the destination server 510 to send a notification to the migration engine 515 when a particular data object has been migrated.

Figure 6A:
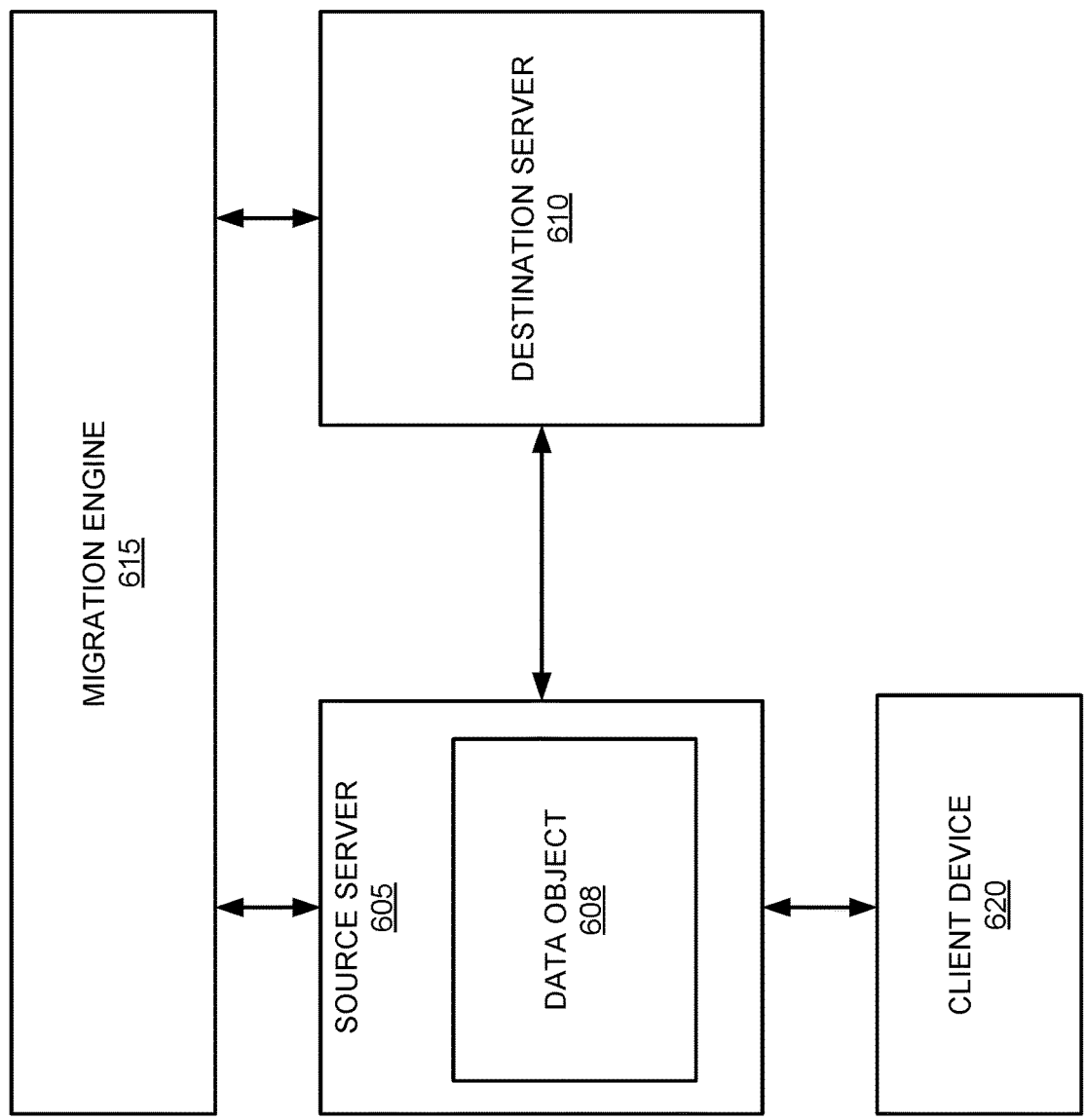
FIG. 6A is a block diagram illustrating a migration system that may be used by an existing client device before a data object is migrated from the source server to a destination server, in accordance with some embodiments.

FIG. 6A is a block diagram illustrating a migration system that may be used by an existing client device before a data object is migrated from the source server to a destination server, in accordance with some embodiments. The migration system includes a source server 605 (which may be similar to the source server 505 of FIG. 5), a destination server 610 (which may be similar to the destination server 510 of FIG. 5), a migration engine 615 (which may be similar to the migration engine 515 of FIG. 5), and a client device 620 (which may be similar to the client device 520 of FIG. 5).

The client device 620 may be referred to as an "existing" client device in that it was aware of the migration before the migration began and issued a request for a migration notification, in this case with respect to the data object 608. As shown in FIG. 6A, the data object 608 has not yet been migrated to the destination server 610. Thus, the client device 620 has not yet received a migration notification from the migration engine 615 notifying the client device 620 that the data object 608 has been migrated to the destination server 610. Thus, the client device 620 continues to access the data object 608 at the source server 605.

Figure 6B:
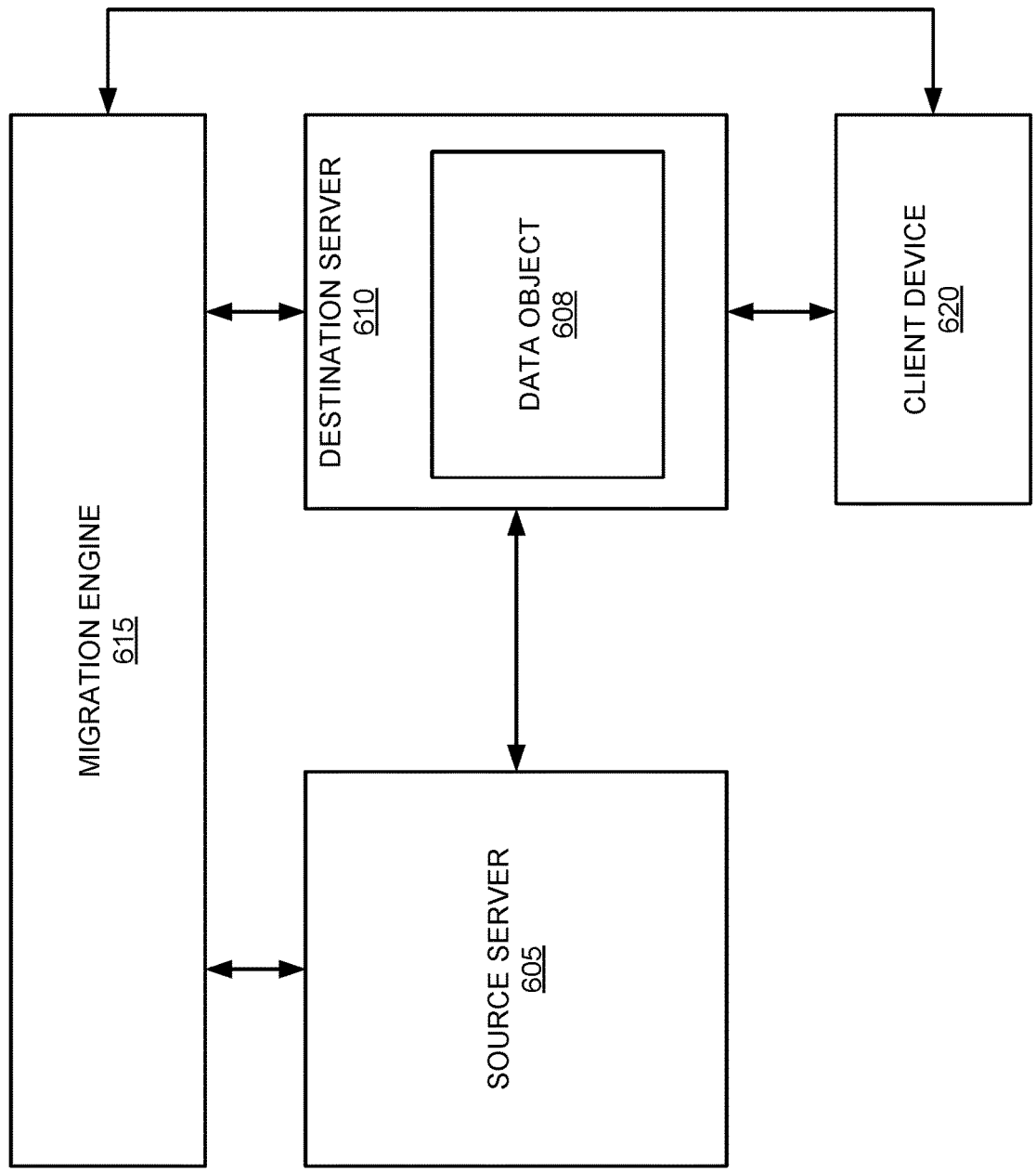
FIG. 6B is a block diagram illustrating a migration system that may be used by an existing client device after a data object is migrated from the source server to a destination server, in accordance with some embodiments.

FIG. 6B is a block diagram illustrating a migration system that may be used by an existing client device after a data object has been migrated from the source server to a destination server, in accordance with some embodiments. As shown in FIG. 6B, the data object 608 of FIG. 6A has been migrated to the destination server 610. Once the data object 608 has been migrated to the destination server 610, the migration engine 615 may generate the migration notification for the client device 620. The migration notification may indicate that the data object 608 of FIG. 6A was migrated from the source server 605 to the destination server 610. The migration notification may further include an address for the destination server 610, such as an IP address associated with the destination server 610. The migration engine 615 may then send the migration notification to the client device 620.

Thus, the client device 620 may begin to access the data object 608 at the destination server 610. The client device 620 may access the data object 608 directly by using the address for the destination server 610. Thus, the client device 620 does not need to go through the source server 605 and/or the migration engine 615 to retrieve the data object 608.

Referral Service

FIG. 6C is a block diagram illustrating a migration system that may be used by a new client device after a data object is migrated from the source server to a destination server, in accordance with some embodiments. The migration system includes the source server 605, the destination server 610, the migration engine 615, and a client device 625. The client device 625 may be referred to as a "new" client device in that it was not aware of the migration before the migration began and/or did not issue a request for a migration notification, in this case with respect to the data object 608.

As shown in FIG. 6C, the client device 625 may issue a request for the data object 608 from the source server 605. The source server 605 may determine that the data object 608 has already been migrated to the destination server 610, either independently or through communication with the migration engine 615. Thus, the source server 605 may implement a referral service, such as through a Distributed File System (DFS) engine 609, to generate a referral for the data object 608 to the destination server 610. As used herein, a "referral" may refer to a notification providing an address for the destination server 610, and/or a redirection to the destination server 610.

DFS allows administrators to group shared folders located on different servers by transparently connecting them to one or more DFS namespaces. A DFS namespace is a virtual view of shared folders in an organization. Using the DFS tools, an administrator can select which shared folders to present in the namespace, design the hierarchy in which those folders appear, and determine the names that the shared folders show in the namespace. When a user views the namespace, the folders appear to reside on a single, high-capacity hard disk. Users can navigate the namespace without needing to know the server names or shared holders hosting the data. DFS also provides for many other benefits, including fault tolerance and load-sharing capabilities, making it usable by many types of organizations. A DFS referral represents a list of targets, transparent to the user, that a DFS client receives from DFS when the user is accessing a root or a link in the DFS namespace. The referral is cached on the DFS client for a time period specified in the DFS configuration.

The referral for the data object 608 may redirect the client device 625 (and any other new client devices requesting the data object 608) to the destination server 610. The destination server 610 may then provide the data object 608 to the client device 625. In some embodiments, the source server 605 may notify the client device 625 that it is being redirected, and provide the client device 625 with the address associated with the destination server 610. The client device 625 may then issue future requests for the data object 608 directly to the destination server 610.

In alternative or additional embodiments, the client device 625 may issue a request for the data object 608 from the source server 605. The source server 605 may return an error to the client device 625 to indicate that the data object 608 is no longer available from the source server 605. In response, the client device 625 may request the referral from the source server 605. The source server 605 may then return the address of the destination server 610 to the client device 625. The client device 625 may then reissue the request for the data object 608 from the destination server 610.

Notification Services

Figure 7:
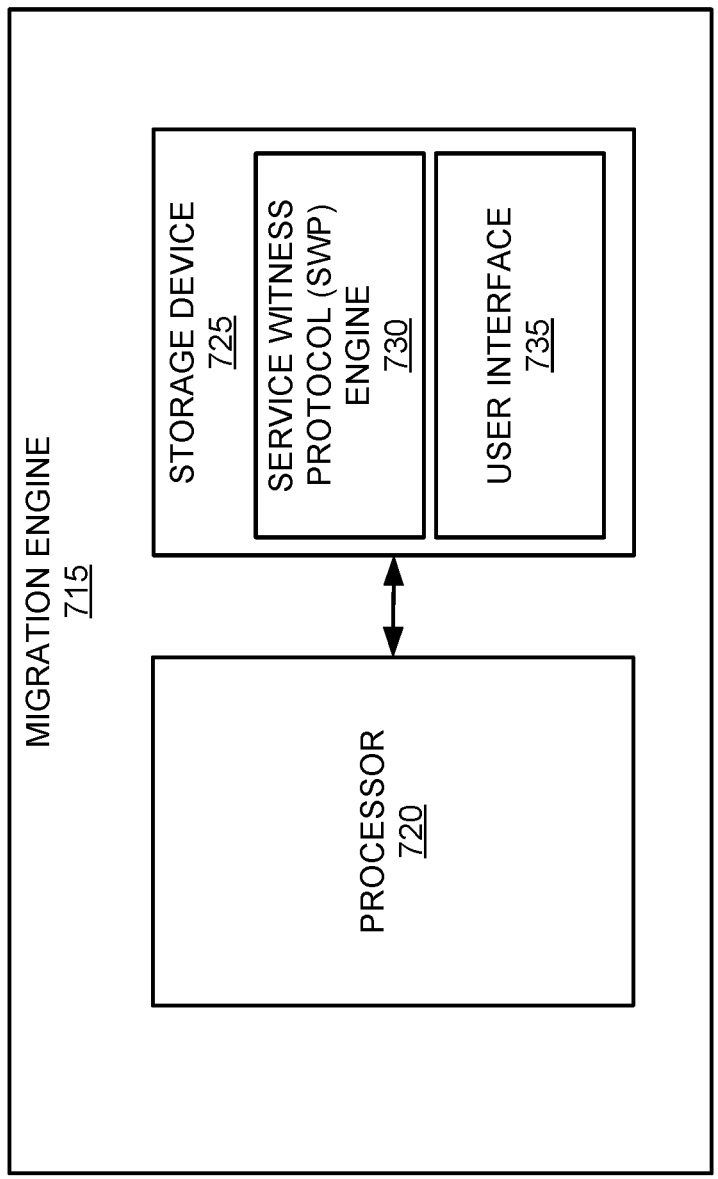
FIG. 7 is a block diagram of a migration engine, in accordance with some embodiments.

FIG. 7 is a block diagram of a migration engine, in accordance with some embodiments. The migration engine 715 may be one implementation of the migration engine 515 of FIG. 5 and/or the migration engine 615 of FIGS. 6A-6C. As described above, the migration engine 715 may be included in a source server and/or a destination server, in some embodiments.

The migration engine 715 may include one or more processors 720. The one or more processors 720 may be in communication with a storage device 725 to execute instructions stored on the storage device 725. The storage device 725 may implement notification services, such as via a Service Witness Protocol (SWP) engine 730 and a user interface 735. SWP is a remote procedure call-based protocol that is used to notify a client of resource changes that have occurred on a highly available server. Thus, the SWP engine 730 may allow a client device to register for a migration notification for a subset of data to be migrated from a source server to a destination server, as described herein. Further, the SWP engine 730 may generate the migration notification after the subset of data was migrated from the source server to the destination server. The migration notification may include the identifier of the client device provided during registration and an identifier of the subset of the data that was migrated. The migration notification may be generated according to any suitable format interpretable by the client device.

The SWP engine 730 may communicate with the client device via user interface 735. The user interface 735 may provide a means through which the client device may request a migration notification from the SWP engine 730. Further, the user interface 735 may provide a means of receiving the migration notification generated by the SWP engine 730. In other words, the user interface 735 may provide an interface between the client device and the SWP engine 730. In some embodiments, the user interface 735 may be provided on a website and/or a display.

The user interface 735 may also provide an interface between a user and a source and/or destination server. For example, the user interface 735 may obtain instructions from a user to initiate migration of data from the source server to the destination server. The instructions may include identifying information (e.g., IP addresses, network names, etc.) of the source and/or destination server, identifying information of the data to be migrated (e.g., a file system identification (FSID), a file name, etc.), and/or any other information necessary to initiate and complete the migration. The user interface 735 may also allow the user to select data for migration and, in some embodiments, to define a specific time for the migration.

Network Protocol

Figure 8:
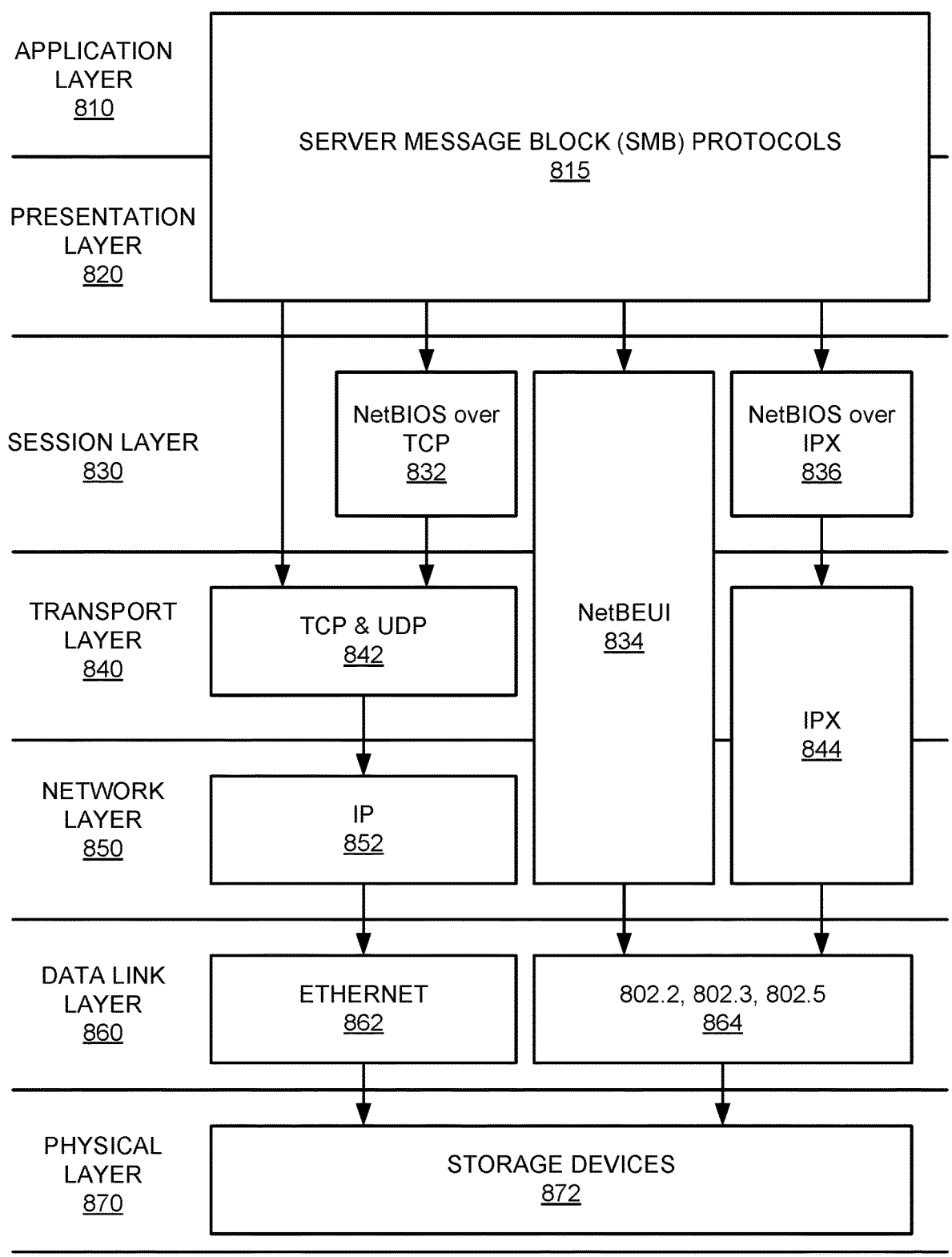
FIG. 8 is a block diagram of a protocol stack that may be implemented by the source server, the destination server and/or the client device, in accordance with some embodiments.

FIG. 8 is a block diagram of a protocol stack that may be implemented by the source server, the destination server and/or the client device, in accordance with some embodiments. The source server, the destination server and/or the client device may implement a network protocol, such as Server Message Block (SMB) protocol, to communicate with each other. Further, the source server and/or the destination server may implement the SMB protocol as a means of migrating data from the source server to the destination server.

The protocol stack may include one or more of seven layers: an application layer 810, a presentation layer 820, a session layer 830, a transport layer 840, a network layer 850, a data link layer 860, and a physical layer 870. Together, these seven layers may represent a model, such as an Open Systems Interconnection (OSI) model. The OSI model of FIG. 8 may characterize the communication functions of the source server, the destination server, and/or the client device. Although shown and described as having seven layers, it is contemplated that the protocol stack may include more or fewer layers to perform less, the same, or additional functions.

According to the OSI model, the application layer 810 may interact with a user (e.g., via receiving user inputs and presenting outputs) and software applications implementing a communication component. The application layer 810 may synchronize communication between entities and determine resource availability. The application layer 810 may be application-specific, in that the specific functions depend on the particular application being executed by the server or device. For example, the application layer 810 on the client device may have functions related to communicating with the source server and/or the destination server to retrieve data needed for a particular application executing on the client device. The application layer 810 on the source server may have functions related to initiating, transforming and migrating data to a destination server. The application layer 810 on the destination server may have functions related to receiving and storing migrated data.

The presentation layer 820 may translate between application and network formats. Various applications and networks may implement different syntaxes and semantics. Thus, the presentation layer 820 may transform data from the network into a form that the application accepts. The presentation layer 820 may also format and encrypt data from the application to be sent on a network.

The session layer 830 may control connections between the client device, the source server, and/or the destination server. The session layer 830 may establish the connections, manage the connections, and terminate the connections used to communicate between the client device, the source server, and/or the destination server.

The transport layer 840 may provide techniques for performing quality of service functions during transfer of data from a source node to a destination node, such as from the source server to the destination server, from the source server to the client device, and/or from the destination server to the client device. The transport layer 840 may provide error control. For example, the transport layer 840 may keep track of data being transmitted and transmit any communications that fail. In addition, the transport layer 840 may provide an acknowledgment of successful data transmission and send the next data to be transmitted in a synchronous fashion if not errors occurred.

The network layer 850 may provide the means of transferring the data from the source node to the destination node over a network. The source node and destination node may each have an address which permits the other to transfer data to it by providing the address with the data. The network layer 850 may also perform routing functions that allow it to a determine a path between the source node and destination node, possibly through other nodes.

The data link layer 860 may define and provide the link between a directly and physically connected source node and destination node. The data link layer 860 may further detect and correct errors occurring at the physical layer 870. In some embodiments, the data link layer 860 may include two sublayers: a media access control (MAC) layer that may control how devices in the network gain access to data and gain permission to transmit it, and a logical link control (LLC) layer that may identify network layer 850 protocols and encapsulate them. These embodiments are implemented with respect to Ethernet 862 and 802.3 of 864.

The physical layer 870 may include one or more storage devices 872. The physical layer 870 may define the electrical and physical specifications of the data. The physical layer 870 may provide a physical medium for storing unstructured raw data to be transmitted and received.

For an SMB connection, the SMB protocols 816 operate as an application layer 810 and presentation layer 820 network protocol for providing access to data. The SMB protocols 816 may operate on top of the session layer 830 (and lower layers) by at least four different methods, as shown in FIG. 8. Any of these methods may be used to implement data sharing and/or data migration according to the systems and methods described herein. Although shown and described as four different methods, it is contemplated that alternative or additional methods of using an SMB connection may be implemented.

First, the SMB protocols 815 may communicate with NetBIOS over Transmission Control Protocol (TCP) 832 in the session layer 830. NetBIOS (Network Basic System) is an application programming interface (API) that may provide services related to the session layer 830 allowing applications on separate devices to communicate over a local area network (LAN). NetBIOS may not support the routing of data to other networks. Thus, NetBIOS over TCP 832 may run over TCP & User Datagram Protocol (UDP) 842 in the transport layer 842. TCP & UDP 842 may be built on top of the Internet Protocol (IP) 852, included in the network layer 840. Ethernet 862 may provide the data link at the data link layer 860, which is in communication with the storage devices 872 at the physical layer 870.

Second, the SMB protocols 815 may communicate directly with TCP & UDP 842 in the transport layer 842, bypassing the session layer 830. TCP & UDP 842 may be built on top of the Internet Protocol (IP) 852, included in the network layer 840. Ethernet 862 may provide the data link at the data link layer 860, which is in communication with the storage devices 872 at the physical layer 870. Although NetBIOS over TCP 832 is bypassed in the second embodiment, the first embodiment may allow communication with a larger number of implementations of SMB. Further, not all devices (e.g., source server, destination server, and/or client device) may support direct hosting of SMB protocols 815 over TCP & UDP 842 and IP 852.

Third, the SMB protocols 815 may communicate with NetBEUI 834 in the session layer 840, the transport layer 840, and the network layer 850. NetBEUI 834 (NetBIOS Extended User Interface) may allow devices to communicate within a local area network, similar to NetBIOS. However, NetBEUI 834 may also formalize the arrangement of data in transmissions. In some embodiments, NetBEUI 834 may also provide routing of data to other networks, making TCP/IP unnecessary in some embodiments. IEEE 802.2, IEEE 802.3, and/or IEEE 802.5 864 may provide the data link at the data link layer 860, which is in communication with the storage devices 872 at the physical layer 870.

Fourth, the SMB protocols 815 may communicate with NetBIOS over IPX 836. As described above, NetBIOS is an application programming interface (API) that may provide services related to the session layer 830 allowing applications on separate devices to communicate over a local area network (LAN), and may not support the routing of data to other networks. Thus, NetBIOS over IPX 836 may run over Internetwork Packet Exchange (IPX) 844 in the transport layer 840 and the network layer 850. IEEE 802.2, IEEE 802.3, and/or IEEE 802.5 864 may provide the data link at the data link layer 860, which is in communication with the storage devices 872 at the physical layer 870.

Data Migration Methods

Figure 9:
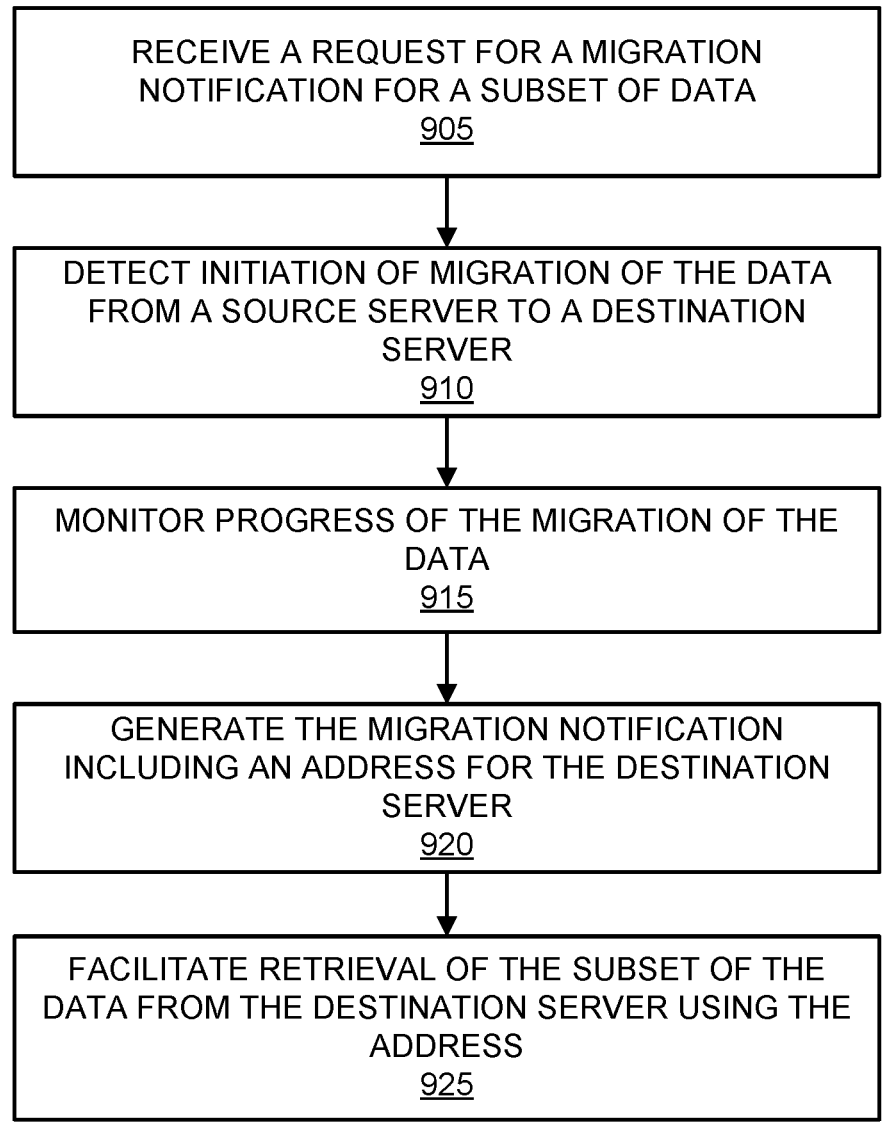
FIG. 9 is a flowchart illustrating a method for live data migration with automatic redirection, in accordance with some embodiments.

Various methods may be used to implement the systems for live data migration with automatic redirection as described herein. FIG. 9 is a flowchart illustrating a method for live data migration with automatic redirection, in accordance with some embodiments. The method of FIG. 9 may be implemented by a migration manager, for example, with may be collocated with or separate from the source server and/or the destination server.

At step 905, a request for a migration notification for a subset of data is received from a client device. The request may include an identifier associated with the client device (e.g., a name, an IP address, a MAC address, etc.) and an identifier of the subset of the data (e.g., a name, an address, any identifying characteristic, etc.). In some embodiments, the request for the migration notification may be received and processed in accordance with the SWP protocol. The subset of data may be required, for example, to continue executing an application running on the client device. For example, a client device may be executing an application that requires data available at the source server. If the data is migrated from the source server to the destination server, the data may no longer be accessible at the source server. When the client device attempts to run the application, the application may no longer be able to execute without the data. Thus, a migration notification may be desirable in order for the client device to be informed about the location and status of the data. Although referred to as a "subset" of data, it is contemplated that the client device may request a migration notification for any amount of data to be migrated from the source server to the destination server, including all of the data or one or more particular data objects, such as a file system. A subset may be included within that amount of data. In the case of multiple data objects, multiple migration notifications may be requested such that the client device is made aware when each data object has been migrated. Thus, although described herein with respect to "a migration notification", it is contemplated that the client device may register to receive multiple migration notifications. Further, it is contemplated that multiple client devices may request to receive one or more migration notifications for one or more subsets of data in some embodiments.

In some embodiments, a client device submitting a request for a migration notification may first be authenticated. For example, the identity of the client device may be authenticated by user input (e.g., a password), by automatic detection (e.g., by confirming an IP address), and the like. In some embodiments, a client device may be confirmed as having the proper permissions to access the subset of the data for which the request is being submitted. For example, in the case of a file, the client device may be confirmed as having at least read access to the file.

At step 910, initiation of migration of the data from a source server to a destination server is detected. For example, the source server may detect that data is being uploaded. In another example, the destination server may detect that data is being downloaded. For example, the source server and/or the destination server may detect, for example, that particular data blocks are being deleted at the source server and/or added at the destination server, that a mapping at the source server and/or the destination server is changing to reflect the addition or deletion of data, etc. In still another example, the source server and/or the destination server may generate a notification when migration has been initiated. In some embodiments, the source server and the destination server may implement SMB protocol. In some embodiments, the data may be migrated in accordance with Z File System (ZFS) technology.

At step 915, progress of the migration of the data from the source server to the destination server is monitored. For example, the progress of the migration may be monitored in real time or near real time, as the migration is occurring, as opposed to only after the migration is complete. In some embodiments, all of the data to be migrated may be monitored. In some embodiments, only the subset of data indicated by the migration notification may be monitored. As specific examples of monitoring, it may be determined whether the subset of the data remains on the source server, has been added to the destination server, is represented in a namespace on the source server and/or the destination server, etc. In some embodiments, during migration of the data from the source server to the destination server, and before the subset of the data is migrated to the destination server, retrieval of the subset of the data from the source server by the client device may be facilitated, as described herein with respect to FIG. 6A.

At step 920, the migration notification is generated. The migration notification may be generated during migration of the data from the source server to the destination server, and after the subset of the data is migrated to the target server. The migration notification may indicate that the subset of the data was migrated from the source server to the destination server through identification of the subset of the data (e.g., a file name, a directory name, a folder name, etc.) and a flag or any other indicator of completion. The migration notification may include an address for the destination server. In some embodiments, the migration notification may further include a location on the destination server associated with the subset of the data. In some embodiments, the migration notification may be generated in accordance with SWP protocol.

At step 925, retrieval of the subset of the data from the target server by the client device using the address may be facilitated. Facilitating may include transmitting the migration notification to the client device. The migration notification may be transmitted over a network or locally to the client device. The migration notification may be pushed or otherwise transmitted to the client device as soon as the subset of the data is accessible to the client device on the destination server, i.e., after the subset of the data is loaded on the destination server. Using the address, the client device may begin to access the subset of the data directly from the destination server. For example, the client device may begin to generate read requests for the subset of the data and transmit the read requests directly to the destination server. Thus, the client device does not need to go through the source server to retrieve the subset of the data.

In some embodiments, after the subset of the data is migrated, a referral to the destination server may be generated that is stored at the source server. The referral may redirect a mount or a request for the subset of the data by a subsequent client device (also referred to herein as a "new client device") to the destination server, as described herein with respect to FIG. 6C. In some embodiments, the referral may be generated in accordance with DFS protocol.

Thus, some embodiments of the present invention provide systems and methods for live data migration with automatic redirection. According to some embodiments, any client applications or devices accessing the migrated data may stay live and any new requests may be automatically redirected to the destination server to which the data was migrated. This may be accomplished, for example, using a combination of network protocols (e.g., Server Message Block (SMB)), notification services (e.g., Service Witness Protocol (SWP)), and/or referral services (e.g., Distributed File System Referral Protocol (DFS)).

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. The computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as performing or being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method comprising:
   receiving, at a migration engine and from a client device, a request to access one or more data objects residing on a source server;
      receiving, by the migration engine, an initiation notification from at least one of the source server or a destination server, the initiation notification indicating an initiation of a data migration of a plurality of data objects from the source server to the a destination server, wherein the plurality of data objects include at least the one or more data objects;
   in response to receiving the initiation notification, monitoring, by the migration engine, progress of the data migration of the plurality of data objects from the source server to the destination server; and
   during the data migration of the plurality of data objects from the source server to the destination server:
   determining whether the request includes a request for a migration notification, the request for the migration notification including a first identifier associated with the client device and at least a second identifier associated with the one or more data objects;
   in response to determining that the request includes the request for the migration notification: before the one or more data objects of the plurality of data objects are migrated to the destination server, causing the source server to transmit the one or more data objects to the client device;
   determining that the one or more data objects have been migrated to the destination server;
   in response to determining that the one or more data objects have been migrated to the destination server, generating, by the migration engine, the migration notification for the one or more data objects, wherein the migration notification includes an address of the destination server and data identifying the one or more data objects within the destination server;
   detecting the initiation of the data migration by detecting that a first mapping at the source server is changing to reflect a deletion of data and that a second mapping at the destination server is changing to reflect an addition of data; and
   transmitting, by the migration engine, the migration notification to the client device, wherein processing of the migration notification triggers requesting direct access of the one or more data objects at the address the destination server so as to bypass the source server; and
   in response to determining that the request does not include the request for the migration notification:
   generating a virtual namespace on the source server, wherein the virtual namespace identifies the address of the destination server and the data identifying the one or more data objects within the destination server, and wherein the virtual namespace is generated using a Distributed File System (DFS) engine implemented within the migration engine; and
   redirecting the client device to the virtual namespace to facilitate access of the one or more data objects by the client device.

2. The method of claim 1, wherein each of the source server and the destination server implement a Server Message Block (SMB) protocol.

3. The method of claim 1, wherein the request for the migration notification is received and the migration notification is generated using a Service Witness Protocol (SWP) engine implemented within the migration engine.

4. The method of claim 1, further comprising:
   detecting, based on notifications received from the source server and the destination server, that a plurality of data blocks corresponding to the one or more data objects are being deleted at the source server and that the plurality of data blocks is being added at the destination server.

5. The method of claim 1, wherein the migration engine is a computer system operating separately and independently from both of the source server and the destination server.

6. The method of claim 1, further comprising: during the data migration of the plurality of data objects from the source server to the destination server and before the one or more data objects of the plurality of data objects are migrated to the destination server, generating one or more periodic notifications that indicate a degree of the progress with respect to the data migration of the plurality of data objects; and
transmitting the one or more periodic notifications to the source server while the source server continues to transmit the one or more data objects to the client device.

7. The method of claim 6, wherein the one or more periodic notifications further indicate a time at which the data migration of the plurality of data objects is expected to be completed.

8. A device comprising:
one or more processors; and
a non-transitory computer-readable medium containing instructions that, when executed by the one or more processors, cause the one or more processors to perform operations including:
receiving, from a client device, a request to access one or more data objects residing on a source server;
receiving an initiation notification from at least one of the source server or a destination server, the initiation notification indicating an initiation of a data migration of a plurality of data objects from the source server to the a destination server, wherein the plurality of data objects include at least the one or more data objects;
in response to receiving the initiation notification, monitoring progress of the data migration of the plurality of data objects from the source server to the destination server; and
during the data migration of the plurality of data objects from the source server to the destination server:
determining whether the request includes a request for a migration notification, the request for the migration notification including a first identifier associated with the client device and at least a second identifier associated with the one or more data objects;
in response to determining that the request includes the request for the migration notification:
before the one or more data objects of the plurality of data objects are migrated to the destination server, causing the source server to transmit the one or more data objects to the client device;
determining that the one or more data objects have been migrated to the destination server;
in response to determining that the one or more data objects have been migrated to the destination server, generating the migration notification for the one or more data objects, wherein the migration notification includes an address of the destination server and data identifying the one or more data objects within the destination server;
detecting the initiation of the data migration by detecting that a first mapping at the source server is changing to reflect a deletion of data and that a second mapping at the destination server is changing to reflect an addition of data; and
transmitting the migration notification to the client device, wherein processing of the migration notification triggers requesting direct access of the one or more data objects at the address the destination server so as to bypass the source server; and
in response to determining that the request does not include the request for the migration notification:
generating a virtual namespace on the source server, wherein the virtual namespace identifies the address of the destination server and the data identifying the one or more data objects within the destination server, and wherein the virtual namespace is generated using a Distributed File System (DFS) engine implemented within the migration engine; and
redirecting the client device to the virtual namespace to facilitate access of the one or more data objects by the client device.

9. The device of claim 8, wherein each of the source server and the destination server implement a Server Message Block (SMB) protocol.

10. The device of claim 8, wherein the request for the migration notification is received and the migration notification is generated using a Service Witness Protocol (SWP) engine implemented within the device.

11. The device of claim 8, wherein the instructions further cause the one or more processors to perform operations including:
detecting, based on notifications received from the source server and the destination server, that a plurality of data blocks corresponding to the one or more data objects are being deleted at the source server and that the plurality of data blocks is being added at the destination server.

12. The device of claim 8, wherein the migration engine is a computer system operating separately and independently from both of the source server and the destination server.

13. The device of claim 8, wherein the instructions further cause the one or more processors to perform operations including:
during the data migration of the plurality of data objects from the source server to the destination server and before the one or more data objects of the plurality of data objects are migrated to the destination server, generating one or more periodic notifications that indicate a degree of the progress with respect to the data migration of the plurality of data objects; and
transmitting the one or more periodic notifications to the source server while the source server continues to transmit the one or more data objects to the client device.

14. The device of claim 13, wherein the one or more periodic notifications further indicate a time at which the data migration of the plurality of data objects is expected to be completed.

15. A computer-program product tangibly embodied in a non-transitory machine-readable storage medium of a device, including instructions that, when executed by one or more processors, cause the one or more processors to:
receive, from a client device, a request to access one or more data objects residing on a source server;
receive an initiation notification from at least one of the source server or a destination server, the initiation notification indicating an initiation of a data migration of a plurality of data objects from the source server to the a destination server, wherein the plurality of data objects include at least the one or more data objects;

in response to receiving the initiation notification, monitor progress of the data migration of the plurality of data objects from the source server to the destination server; and during the data migration of the plurality of data objects from the source server to the destination server:

determining whether the request includes a request for a migration notification, the request for the migration notification including a first identifier associated with the client device and at least a second identifier associated with the one or more data objects;

in response to determining that the request includes the request for the migration notification:

before the one or more data objects of the plurality of data objects are migrated to the destination server, cause the source server to transmit the one or more data objects to the client device;

determine that the one or more data objects have been migrated to the destination server;

in response to determining that the one or more data objects have been migrated to the destination server, generate the migration notification for the one or more data objects, wherein the migration notification includes an address of the destination server and data identifying the one or more data objects within the destination server;

detect the initiation of the data migration by detecting that a first mapping at the source server is changing to reflect a deletion of data and that a second mapping at the destination server is changing to reflect an addition of data; and transmit the migration notification to the client device, wherein processing of the migration notification triggers requesting direct access of the one or more data objects at the address the destination server so as to bypass the source server; and in response to determining that the request does not include the request for the migration notification:

generating a virtual namespace on the source server, wherein the virtual namespace identifies the address of the destination server and the data identifying the one or more data objects within the destination server, and wherein the virtual namespace is generated using a Distributed File System (DFS) engine implemented within the migration engine; and redirecting the client device to the virtual namespace to facilitate access of the one or more data objects by the client device.

* * * * *

UNITED STATES PATENT AND TRADEMARK OFFICE
CERTIFICATE OF CORRECTION

PATENT NO. : 10,997,132 B2
APPLICATION NO. : 15/426440
DATED : May 4, 2021
INVENTOR(S) : Shivam et al.

Page 1 of 1

It is certified that error appears in the above-identified patent and that said Letters Patent is hereby corrected as shown below:

On the Title Page

On page 2, Column 2, item (56) under Other Publications, Line 14, delete "Coments:" and insert -- Comments: --, therefor.

On page 2, Column 2, item (56) under Other Publications, Line 28, delete "Meterological" and insert -- Meteorological --, therefor.

On page 2, Column 2, item (56) under Other Publications, Line 51, delete "Intesive" and insert -- Intensive --, therefor.

In the Claims

In Column 20, Line 2, in Claim 1, delete "the a" and insert -- the --, therefor.

In Column 21, Line 32, in Claim 8, delete "the a" and insert -- the --, therefor.

In Column 22, Line 66, in Claim 15, delete "the a" and insert -- the --, therefor.

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*